US010920621B2

(12) United States Patent
Murphy et al.

(10) Patent No.: US 10,920,621 B2
(45) Date of Patent: Feb. 16, 2021

(54) HORIZONTAL ENGINE BUILD STAND

(71) Applicant: United Technologies Corporation, Farmington, CT (US)

(72) Inventors: Gabrielle Murphy, Hartford, CT (US); Robert M. Lewis, Berlin, CT (US); Gregory E. Reinhardt, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 211 days.

(21) Appl. No.: 16/250,287

(22) Filed: Jan. 17, 2019

(65) Prior Publication Data

US 2019/0153900 A1 May 23, 2019

Related U.S. Application Data

(62) Division of application No. 14/883,682, filed on Oct. 15, 2015, now Pat. No. 10,221,724.

(51) Int. Cl.
*B23P 19/04* (2006.01)
*F01D 25/28* (2006.01)
(Continued)

(52) U.S. Cl.
CPC ......... *F01D 25/285* (2013.01); *B25H 1/0007* (2013.01); *B64F 5/50* (2017.01);
(Continued)

(58) Field of Classification Search
CPC .......... B23P 11/00; B23P 19/00; B23P 15/00; B23Q 1/03; B23Q 1/70; B23Q 3/00;
(Continued)

(56) References Cited

U.S. PATENT DOCUMENTS 4,202,539 A   5/1980  Polastri et al.
4,452,558 A   6/1984  Muraguchi
              (Continued)

FOREIGN PATENT DOCUMENTS

BE        560669 A      9/1957
WO    2014154663 A1    10/2014

OTHER PUBLICATIONS

European Extended Search Report dated Feb. 23, 2017, issued in the corresponding European Patent Application No. 16194198.4.

*Primary Examiner* — Lee D Wilson
(74) *Attorney, Agent, or Firm* — Bachman & LaPointe, P.C.

(57) ABSTRACT

A horizontal support tool for an engine build stand, the horizontal support tool includes a support tube along an axis and a tie shaft between a handle and a puck assembly, the puck assembly including a puck selectively extendable and retractable transverse to the axis in response to rotation of the handle. A method of horizontally assembling a portion of a gas turbine engine including mounting a first module to an engine build stand; installing a horizontal support tool into the first module, the horizontal support tool supported in a spherical bearing supported by the engine build stand; and installing a second module to the first module, the horizontal support tool operable to at least partially support second module.

12 Claims, 17 Drawing Sheets

(51) Int. Cl.
*F02C 7/20* (2006.01)
*B64F 5/50* (2017.01)
*B25H 1/00* (2006.01)
*F01D 25/16* (2006.01)
*F01D 25/24* (2006.01)
*F04D 29/52* (2006.01)

(52) U.S. Cl.
CPC .......... *F01D 25/162* (2013.01); *F01D 25/24* (2013.01); *F02C 7/20* (2013.01); *F04D 29/522* (2013.01); *F05D 2220/32* (2013.01); *F05D 2230/60* (2013.01); *F05D 2230/68* (2013.01); *F05D 2230/70* (2013.01); *F05D 2240/60* (2013.01)

(58) Field of Classification Search
CPC ........ B23Q 1/0063; B23Q 3/06; B23Q 3/061; B23Q 3/154
See application file for complete search history.

(56) References Cited

U.S. PATENT DOCUMENTS

| | | |
|---|---|---|
| 4,491,307 A | 1/1985 | Ellefson |
| 4,526,503 A | 7/1985 | Muraguchi |
| 4,533,128 A | 8/1985 | Guigon |
| 4,686,925 A | 8/1987 | Stuck |
| 5,707,053 A | 1/1998 | Plunkett et al. |
| 6,170,141 B1 | 1/2001 | Rossway et al. |
| 6,220,502 B1 | 4/2001 | Gallinger et al. |
| 6,276,058 B1 | 8/2001 | Gallinger et al. |
| 6,279,217 B1 | 8/2001 | Gallinger et al. |
| 6,305,678 B1 | 10/2001 | Hammersmith et al. |
| 6,581,913 B1 | 6/2003 | Conomos et al. |
| 6,796,021 B2 | 9/2004 | Fuller |
| 7,546,742 B2 | 6/2009 | Wakeman et al. |
| 7,715,943 B2 | 5/2010 | Loda |
| 7,735,363 B2 | 6/2010 | Mainville |
| 7,861,579 B2 | 1/2011 | Mainville |
| 8,220,769 B2 | 7/2012 | Mainville et al. |
| 8,534,638 B2 | 9/2013 | Alexander et al. |
| 8,540,204 B2 | 9/2013 | Hernandez et al. |
| 8,567,745 B2 | 10/2013 | Wong et al. |
| 9,896,973 B2 | 2/2018 | Lanni et al. |
| 10,221,724 B2 * | 3/2019 | Murphy ............... B25H 1/0007 |
| 2009/0272358 A1 | 11/2009 | Schober |
| 2012/0279064 A1 | 11/2012 | Reinhardt et al. |
| 2017/0107858 A1 * | 4/2017 | Murphy ............... F01D 25/24 |
| 2019/0153900 A1 * | 5/2019 | Murphy ............... B25H 1/0007 |

* cited by examiner

HORIZONTAL ENGINE BUILD STAND

CROSS-REFERENCE TO RELATED APPLICATION

The instant application is a divisional application of U.S. patent application Ser. No. 14/883,682 filed Oct. 15, 2015.

BACKGROUND

The present disclosure relates to gas turbine engine build stands and, more particularly, relates to a rotor support tool for horizontal assembly.

At least some gas turbine engines include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are oftentimes collectively referred to as the core engine.

Various gas turbine engine build stands are presently available for use in connection with the assembly of gas turbine engines. One type of engine stand includes horizontally disposed rings which mount an engine such that the engine longitudinal axis extends generally vertical. Since the engine is effectively vertical, fluids may leak from the engine and scaffold stands are required for technicians.

In another type of engine stand, a generally horizontally disposed shaft extends through a vertical support member to mount the engine such that the engine longitudinal axis extends generally horizontally. Since the engine is effectively cantilevered, the engine may be subjected to a stress and force moment since the engine center of gravity is displaced from the vertical support.

SUMMARY

A horizontal support tool for an engine build stand, the horizontal support tool according to one disclosed non-limiting embodiment of the present disclosure can include a support tube along an axis; and a tie shaft between a handle and a puck assembly, the puck assembly including a puck selectively extendable and retractable transverse to the axis in response to rotation of the handle.

A further embodiment of the present disclosure may include wherein the support tube is manufactured of a nonmetallic composite material to fit within a shaft of a gas turbine engine.

A further embodiment of the present disclosure may include wherein the support tube is manufactured of layered uniaxial fibers.

A further embodiment of the present disclosure may include wherein the puck is manufactured of a nonmetallic composite material.

A further embodiment of the present disclosure may include wherein the puck assembly includes a return assembly to facilitate retraction of the puck.

A further embodiment of the present disclosure may include, wherein the a return assembly spring biases of the puck.

A further embodiment of the present disclosure may include wherein the puck is generally rectilinear.

A further embodiment of the present disclosure may include wherein the puck provides a line contact.

An engine build stand, according to one disclosed non-limiting embodiment of the present disclosure can include a support structure; a spherical bearing supported by the support structure; and a horizontal support tool receivable within the spherical bearing.

A further embodiment of the present disclosure may include, wherein the horizontal support tool includes: a support tube along an axis; and a tie shaft between a handle and a puck assembly, the puck assembly including a puck selectively extendable and retractable transverse to the axis in response to rotation of the handle.

A further embodiment of the present disclosure may include wherein the support tube is manufactured of a nonmetallic composite material.

A further embodiment of the present disclosure may include a turnbuckle to adjust a position of the horizontal support tool.

A further embodiment of the present disclosure may include a load cell to measure a weight applied to the horizontal support tool.

A method of horizontally assembling a portion of a gas turbine engine, according to one disclosed non-limiting embodiment of the present disclosure can include mounting a first module to an engine build stand;

installing a horizontal support tool into the first module, the horizontal support tool supported in a spherical bearing supported by the engine build stand; and installing a second module to the first module, the horizontal support tool operable to at least partially support the second module.

A further embodiment of the present disclosure may include wherein the first module includes a bearing structure, a high pressure intermediate case (IMC) mounted to the bearing structure, and a high pressure compressor case with rotational compressor hardware therein, the high pressure compressor case mounted to the IMC.

A further embodiment of the present disclosure may include at least partially supporting the first module via a shipping fixture.

A further embodiment of the present disclosure may include preloading the horizontal support tool prior to removing the shipping fixture.

A further embodiment of the present disclosure may include supporting rotational hardware within the second module by the horizontal support tool.

A further embodiment of the present disclosure may include, wherein the second module includes a high pressure turbine case.

A further embodiment of the present disclosure may include preloading the horizontal support tool prior to installation of the second module.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
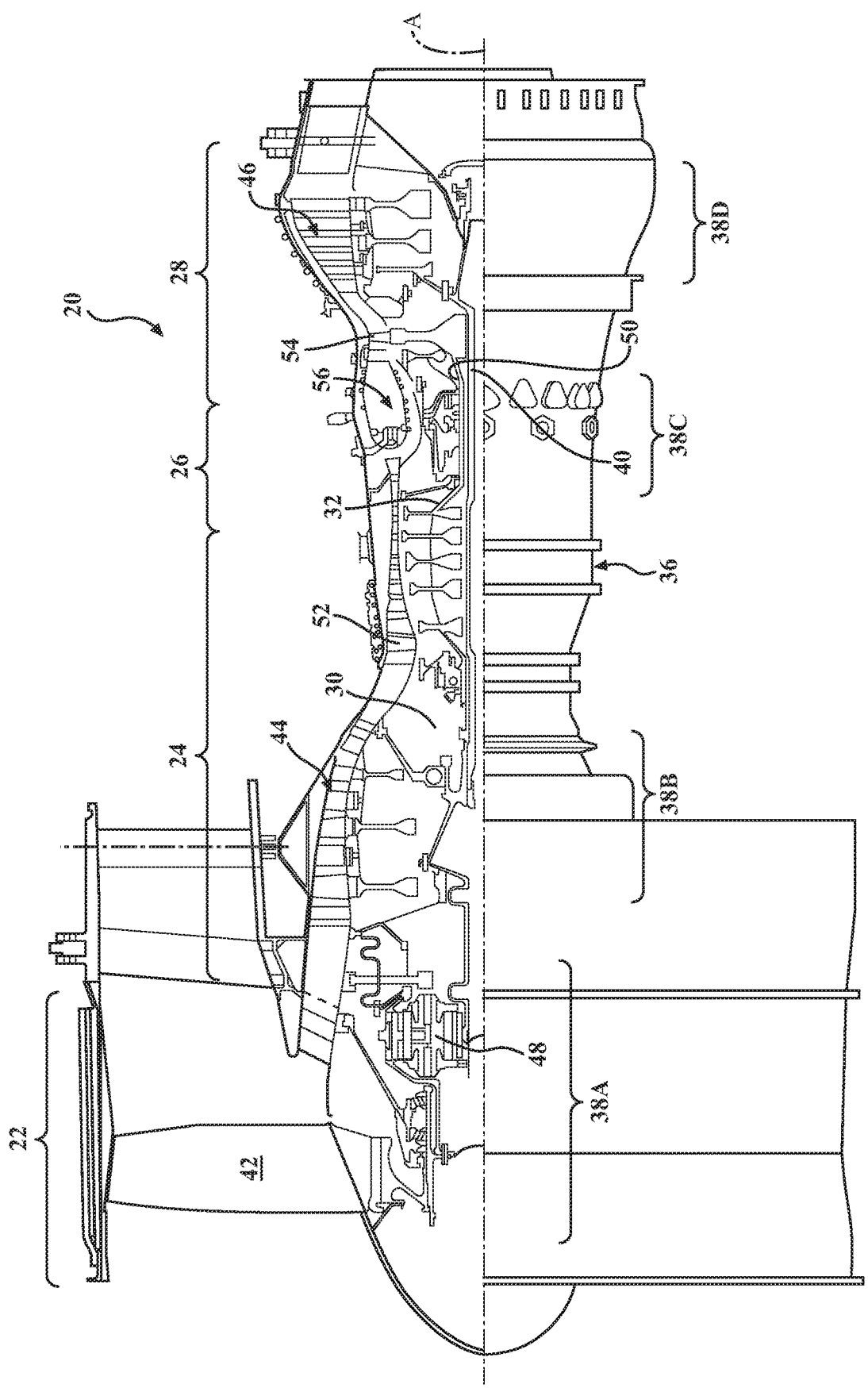
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and along a core flowpath for compression by the compressor section 24, communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architectures such as low bypass turbofans, turbojets, turboshafts, three-spool (plus fan) turbofans and other non-gas turbine components.

The engine 20 generally includes a low spool 30 and a high spool 32 mounted for rotation about an engine central longitudinal axis "A." The low spool 30 generally includes an inner shaft 40 that interconnects a fan 42, a low pressure compressor ("LPC") 44 and a low pressure turbine ("LPT") 46. The inner shaft 40 drives the fan 42 directly, or through a geared architecture 48 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. The HPC 52, the HPT 54 and the combustor 56 are often referred to as the engine core. A combustor 56 is arranged between the high pressure compressor 52 and the high pressure turbine 54. The inner shaft 40 and the outer shaft 50 are concentric and rotate about the engine central longitudinal axis "A," which is collinear with their longitudinal axes.

Core airflow is compressed by the LPC 44, then the HPC 52, mixed with the fuel and burned in the combustor 56, then expanded over the HPT 54, then the LPT 46. The turbines 54, 46 rotationally drive the respective high spool 32 and low spool 30 in response to the expansion. The main engine shafts 40, 50 are supported at a plurality of points by bearing structures 38 within the static structure 36.

Figure 2:
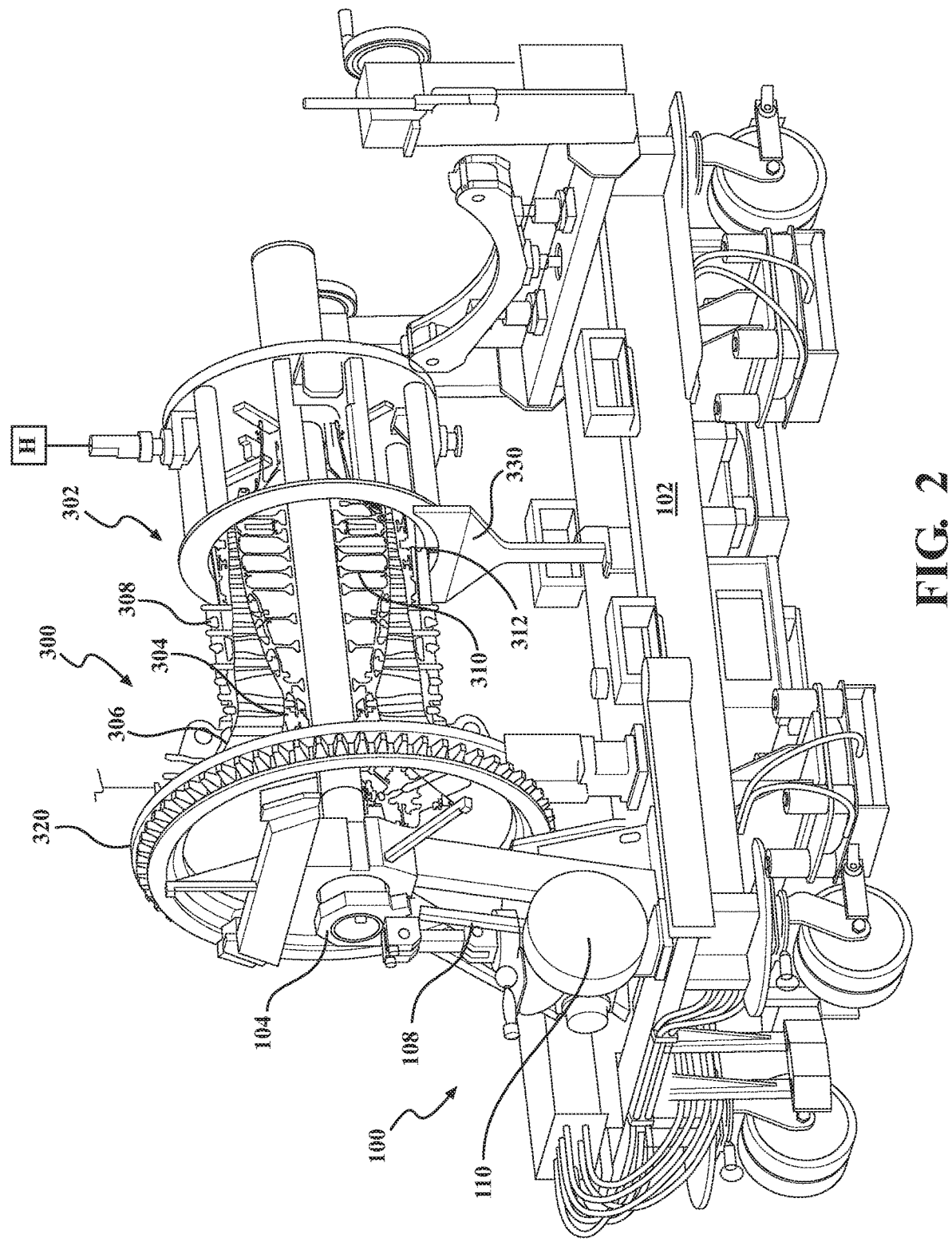
FIG. 2 is a perspective view of a horizontal engine build stand without a horizontal support tool installed.
Figure 3:
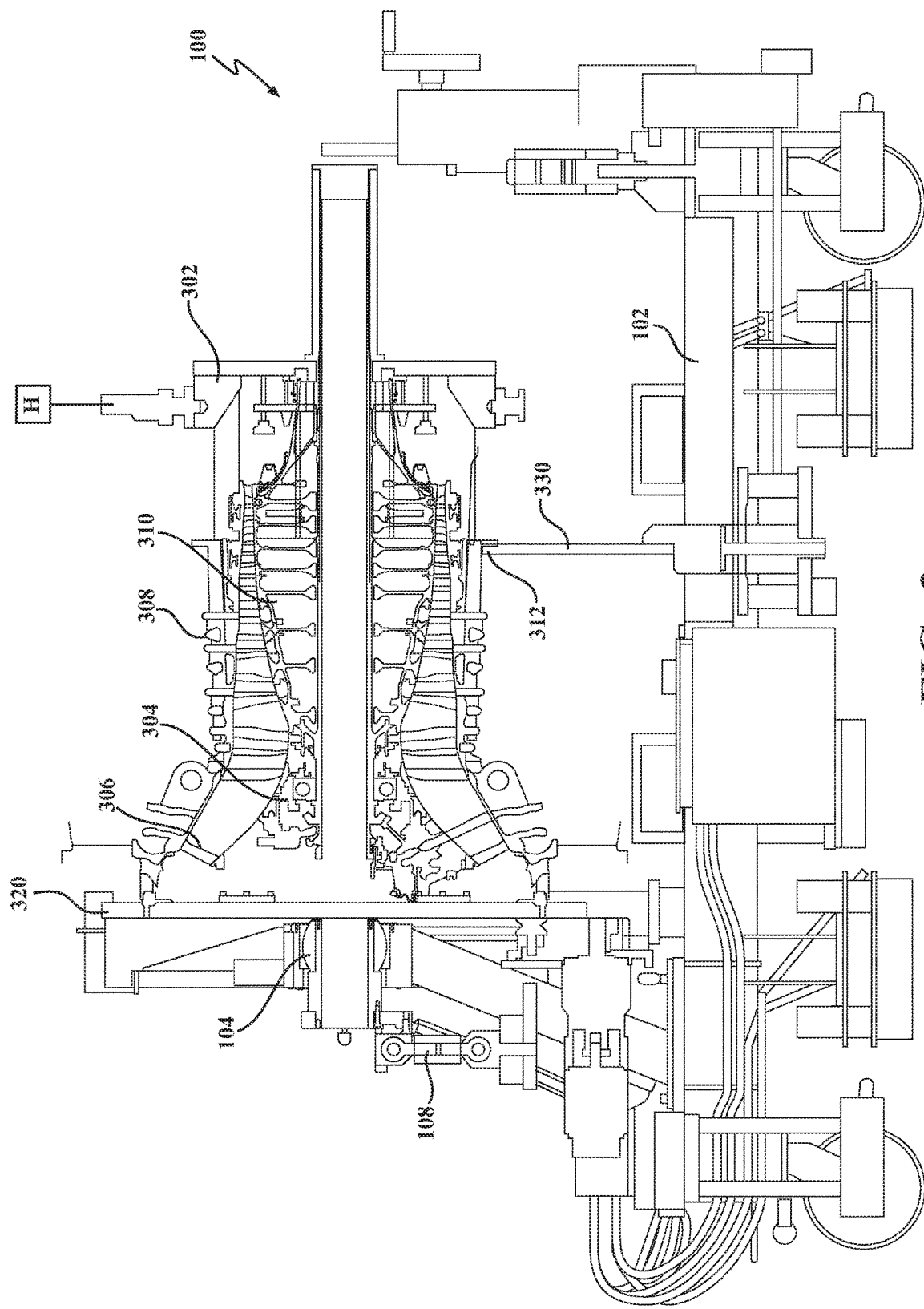
FIG. 3 is a side view of the horizontal engine build stand without the horizontal support tool installed.

With reference to FIGS. 2 and 3, an engine build stand 100 is utilized to support the engine core for horizontal assembly. During core assembly, a bearing, here represented as the #3 bearing structure 38B (FIG. 1), supports the rotational hardware 52R of the HPC 52, but until the #4 bearing structure 38C (FIG. 1) is installed, there is no aft support for the rotational hardware 52R. The rotational engine hardware, may include the rotor stack of the HPC 52, HPT 54, or other rotational components.

The engine build stand 100 generally includes a support structure 102 which positions a spherical bearing assembly 104, and a horizontal support tool 106 (FIG. 4) that extends through the spherical bearing assembly 104, to support the rotational engine hardware during horizontal assembly. The support structure 102 may include one or more turnbuckles 108 or other adjustment devices that adjust the spherical bearing assembly 104, and thus the horizontal support tool 106. The spherical bearing assembly 104 is positioned by the turnbuckles 108 to adjust the position of the horizontal support tool 106 that, although quite stiff, will still deflect to an extent that compensation is required.

Figure 5:
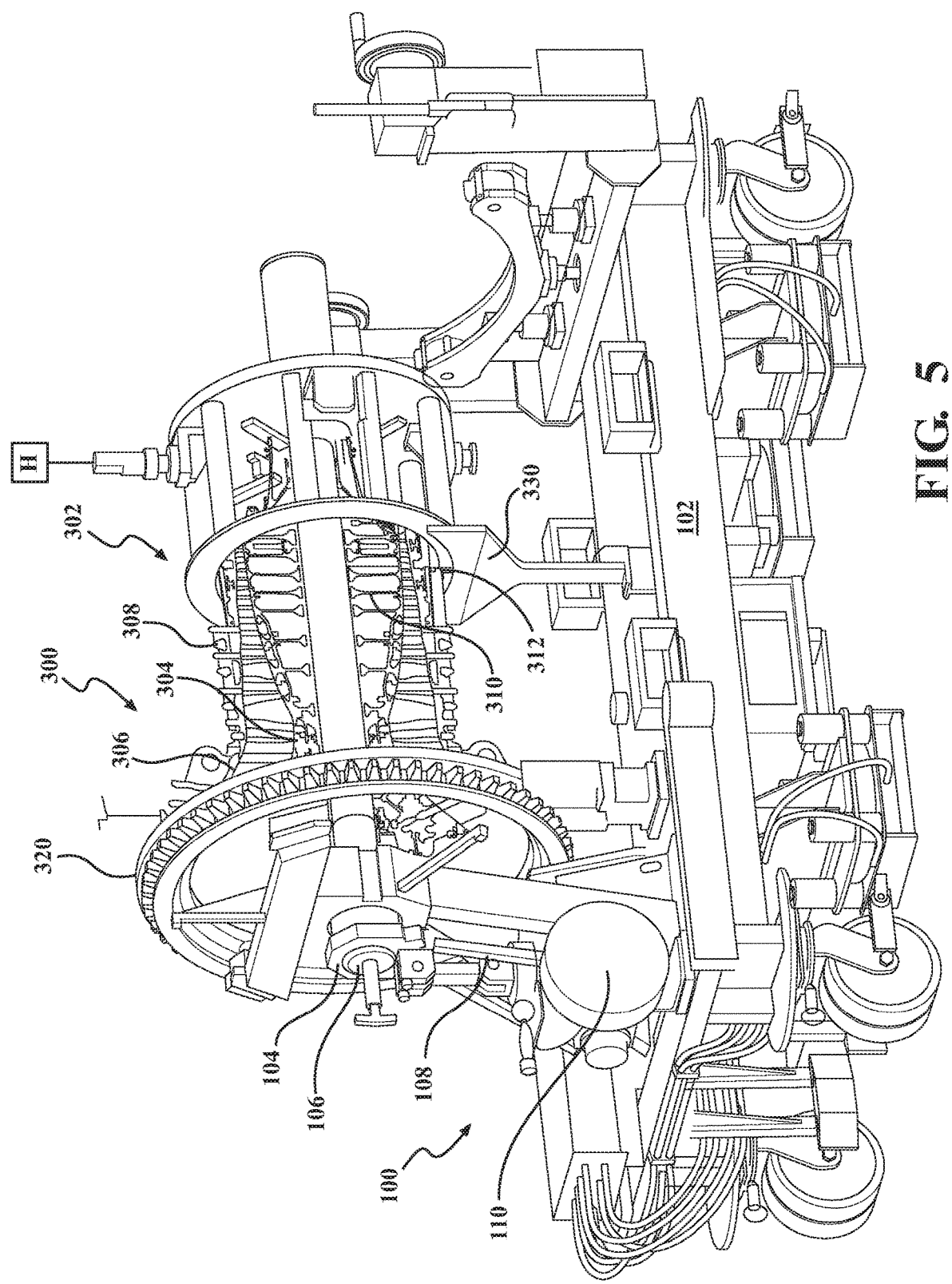
FIG. 5 is a perspective view of a horizontal engine build stand with a horizontal support tool installed within the first module and a shipping fixture.
Figure 6:
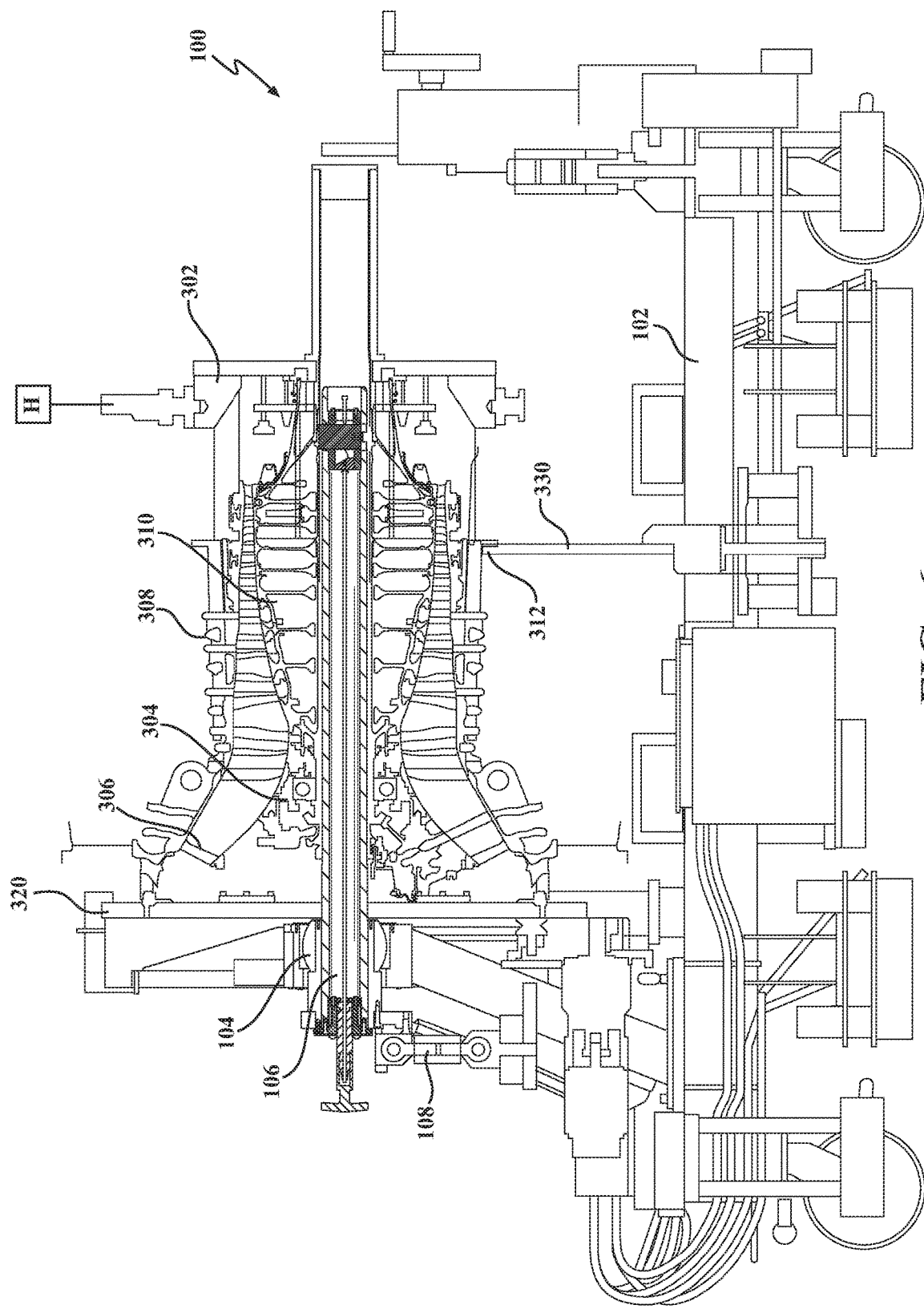
FIG. 6 is a side view of the horizontal engine build stand with the horizontal support tool installed within the first module and a shipping fixture.

With reference to FIGS. 5 and 6, As the horizontal support tool 106 is primarily provided to align and counteract the weight of the rotational engine hardware, the spherical bearing assembly 104 need only be adjusted in the pitch dimension to counteract weight. A load cell 110 or other such measurement device may interface with the spherical bearing assembly 104 to measure a weight applied to the horizontal support tool 106. That is, the support rod assembly 108 may be pitched to compensate for the weight of the rotor stack as the HPC 52 is assembled. Further, as the weight of various modules are known, the horizontal support tool 106 can be pre-adjusted for an expected weight while, or prior, to the next module being assembled.

Figure 7:
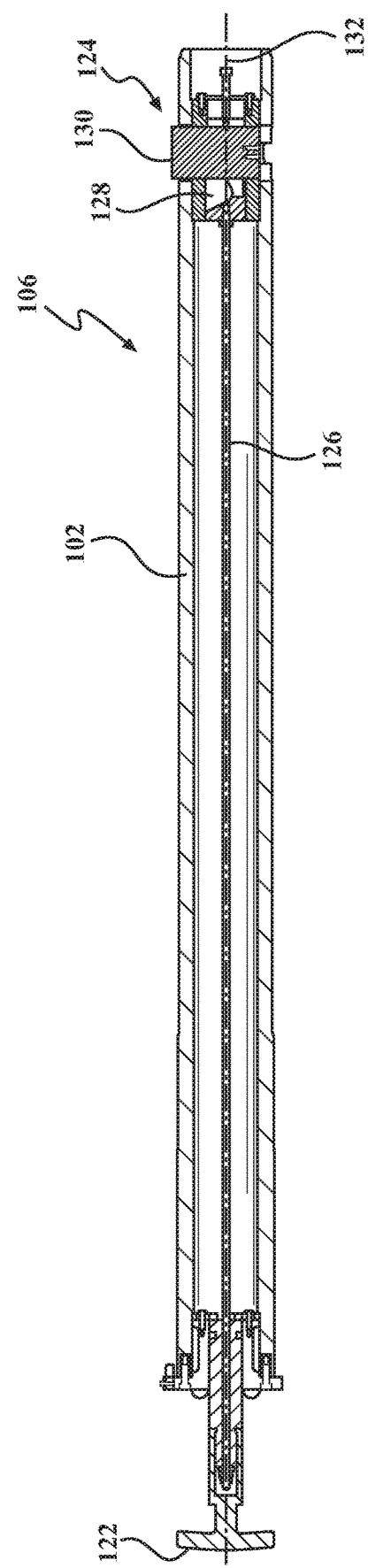
FIG. 7 is a sectional view of the horizontal support tool.

With reference to FIG. 7, the horizontal support tool 106 generally includes a support tube 120, a handle 122, a puck assembly 124 and a tie shaft 126 that connects the handle 122 to the puck assembly 124. The support tube 120 may be manufactured of a nonmetallic composite material that is exceedingly stiff. The composite material, in one example, may be manufactured of layered uniaxial fibers. That is, the horizontal support tool 106 is primarily layered uniaxial fibers and includes minimal 45 degree fibers.

Figure 10:
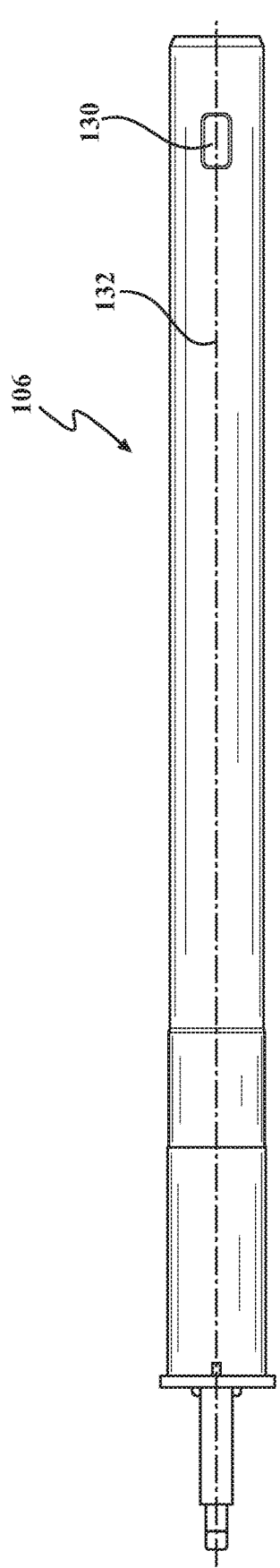
FIG. 10 is a top view of the horizontal support tool.
Figure 8:
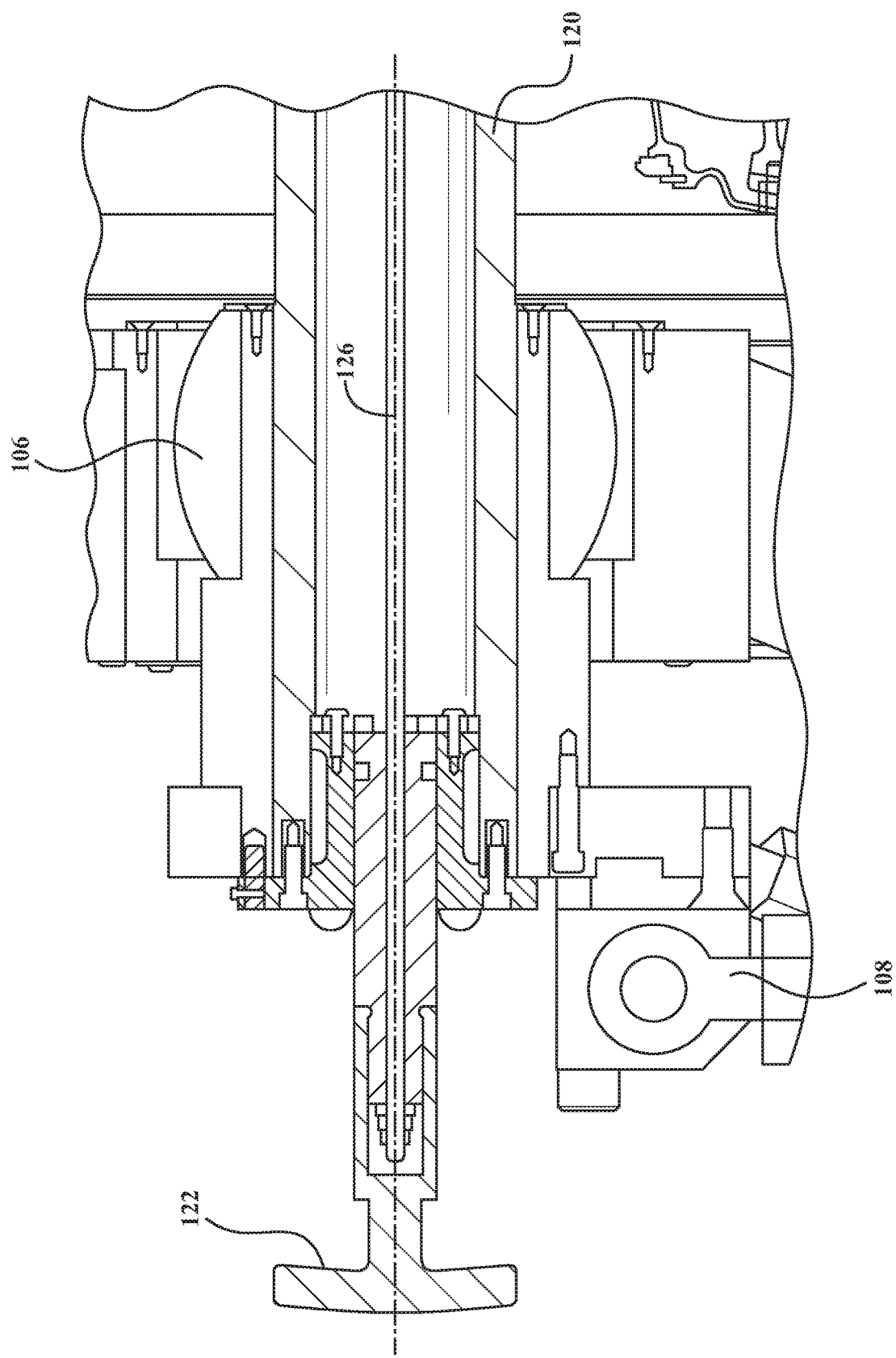
FIG. 8 is an expanded sectional view of one end of the horizontal support tool.
Figure 9:
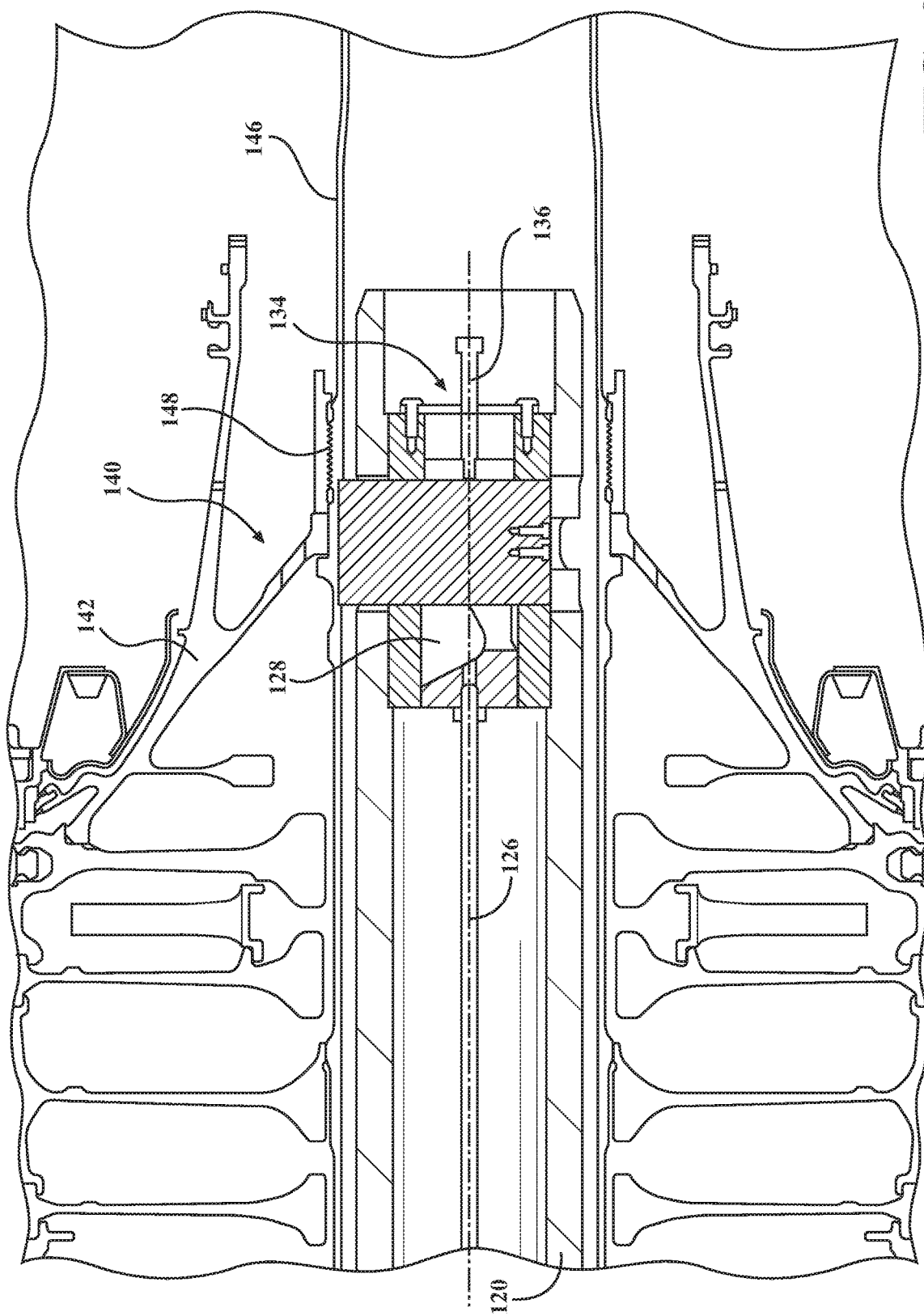
FIG. 9 is an expanded sectional view of the opposite end of the horizontal support tool.

Rotation of the handle 122 (FIG. 8) causes the tie shaft 126 to interact with a ramp 128 of the puck assembly 124 to selectively extend and retract a puck 130 with respect to the support tube 120 (FIG. 9). The tie shaft 126 will retract to allow the puck 130 to lock in the engaged position. The ramp 128 translates the longitudinal motion of the tie shaft 126 to transverse motion of the puck 130 with respect to the support tool 120. The puck 130 is selectively extended and retracted transversely to a longitudinal axis 132 of the horizontal support tool 106. That is, the puck 130 is flush with an outer diameter of the support tube 120 for insertion of the horizontal support tool 106 into the rotational hardware 52R of the HPC 52, then selectively extended to provide contact with the rotational hardware. The puck 130 may be a rectilinear and relatively thin member (FIG. 10) to, for example, provide essentially line contact with the rotor shaft 40 (FIG. 9). The puck assembly 124 may also include a return assembly 134 (FIG. 9). The return assembly 134 generally includes a spring 136 that facilitates retraction of the puck 130 in response to retraction of the tie shaft 126.

Figure 4:
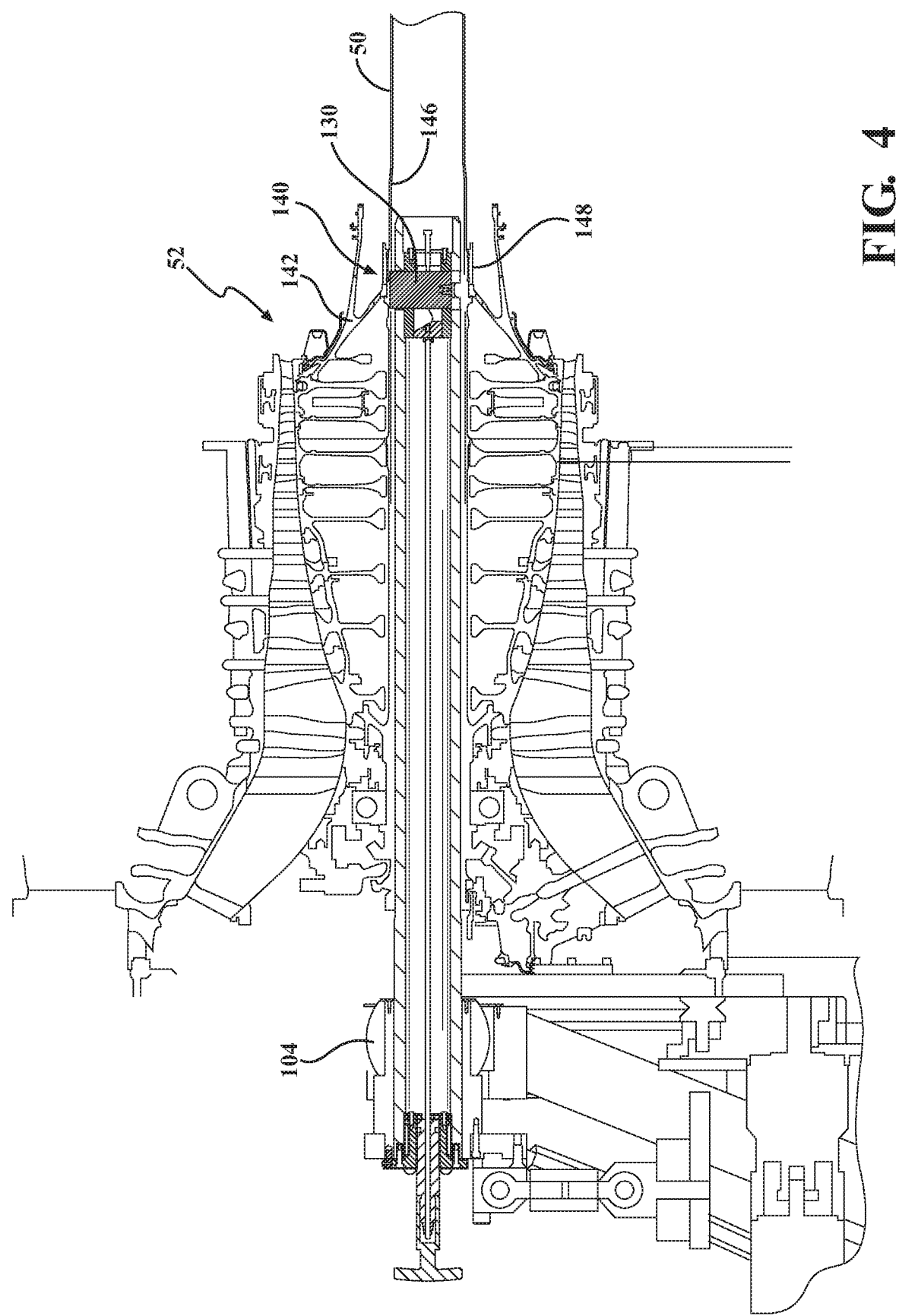
FIG. 4 is a side view of the horizontal support tool installed within a first module that includes a #3 bearing structure, a high pressure intermediate case (IMC), and a high pressure compressor case with the rotational compressor hardware therein.

With reference to FIG. 4, the support tube 120 may be of a length to longitudinally position the puck 130 adjacent to an interface 140 between the HPC 52 and the shaft 50. The interface 140 may, as shown in this example, include an aft interface hub 142, which is received onto a high spool tie shaft 146, and retained thereto by a shaft mid nut 148 (also shown in FIG. 6). It should be appreciated that other applications for the horizontal support tool 106 may be of a length to provide other longitudinal interface locations.

Figure 11:
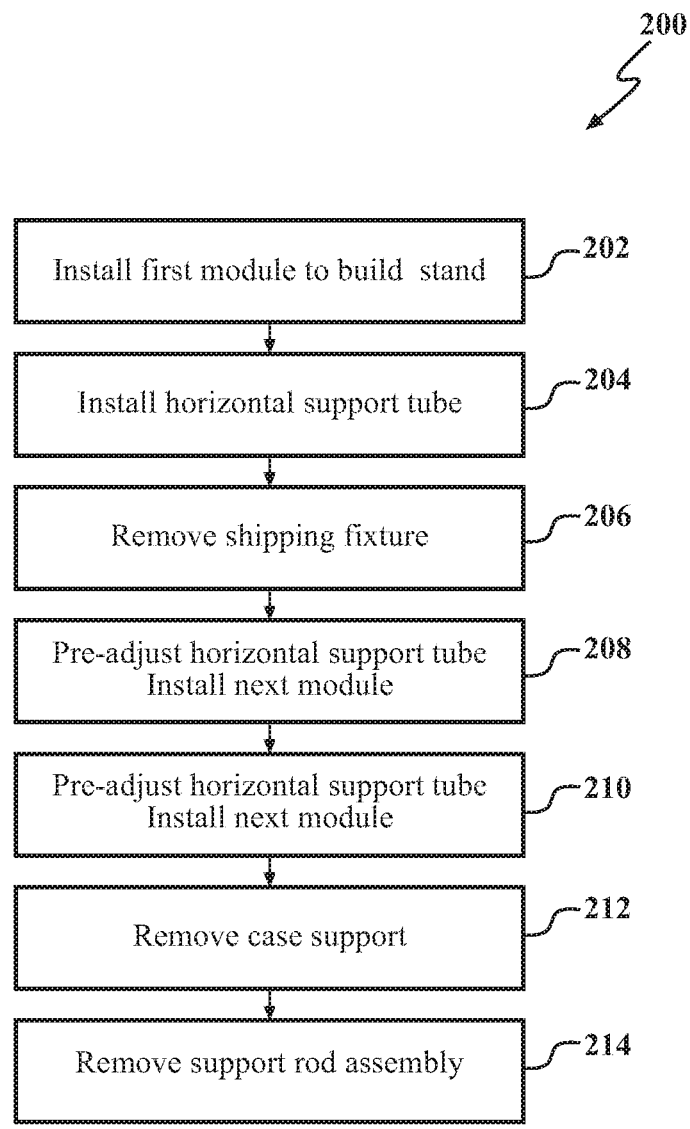
FIG. 11 is a method of horizontally assembling a portion of a gas turbine engine.

With reference to FIG. 11, a method 200 to horizontally assemble the engine core via the horizontal support tool 106 is schematically illustrated in block diagram form. It should be appreciated that although the primary steps, which utilize the horizontal support tool 106, are described, additional or alternative steps such as measurement, quality control, and other steps may be performed but are otherwise not detailed herein. It should be further appreciated that assembly of other such hardware may also benefit herefrom.

Initially, a first module 300, and associated shipping fixture 302 therefor, is installed to the engine build stand 100 (Step 202; FIGS. 2 and 3). In this example, the first module 300 includes a #3 bearing structure 304, a high pressure intermediate case (IMC) 306, and a high pressure compressor case 308 with the rotational compressor hardware 310 therein. The shipping fixture 302 positions and protects the rotational compressor hardware 310 with respect to the high pressure compressor (HPC) case 308 such that, for example, blade seals therein are not unduly contacted by the associated rotor blades. The first module 300 is installed to the engine build stand 100 such that the IMC 306 is bolted to a support ring 320 of the build cart 100 and the HPC case 308 rests upon a case support 330. The case support 330 may be positioned to support a flange 312 of the HPC case 308 to which the shipping fixture 302 is attached.

Figure 12:
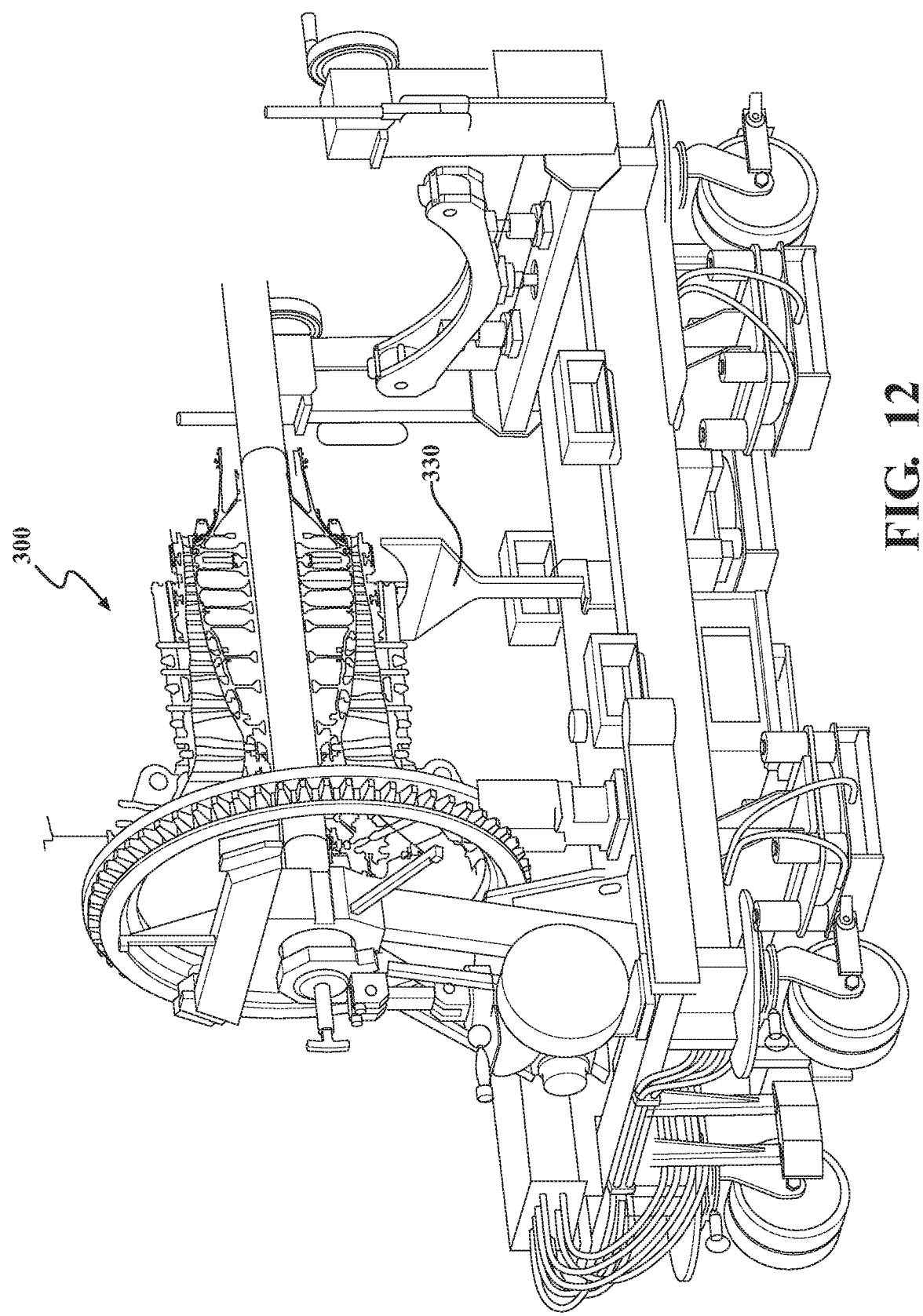
FIG. 12 is a perspective view of a horizontal engine build stand with a horizontal support tool installed within the first module and the shipping fixture removed.

Next, the horizontal support tool 106 is installed into the first module 300 and the puck extended to support the rotational hardware 310 in a cantilevered manner (step 204; FIGS. 5 and 6). As the weight of the first module 300 is known, the horizontal support tube 106 may be pre-adjusted in pitch for the expected weight while the shipping fixture 302 is still supported such as by an overhead hoist H. To load the horizontal support tool 106, the turnbuckle 108 is tightened at the bottom, pulling the spherical bearing assembly 104 and the horizontal support tool 106 down and reacting at the puck end of the horizontal support tool 106. The weight of the rotational hardware 310 is transferred from the shipping fixture 302 to the horizontal support tool 106 such that the shipping fixture 302 can be removed (step 206; FIG. 12).

Figure 13:
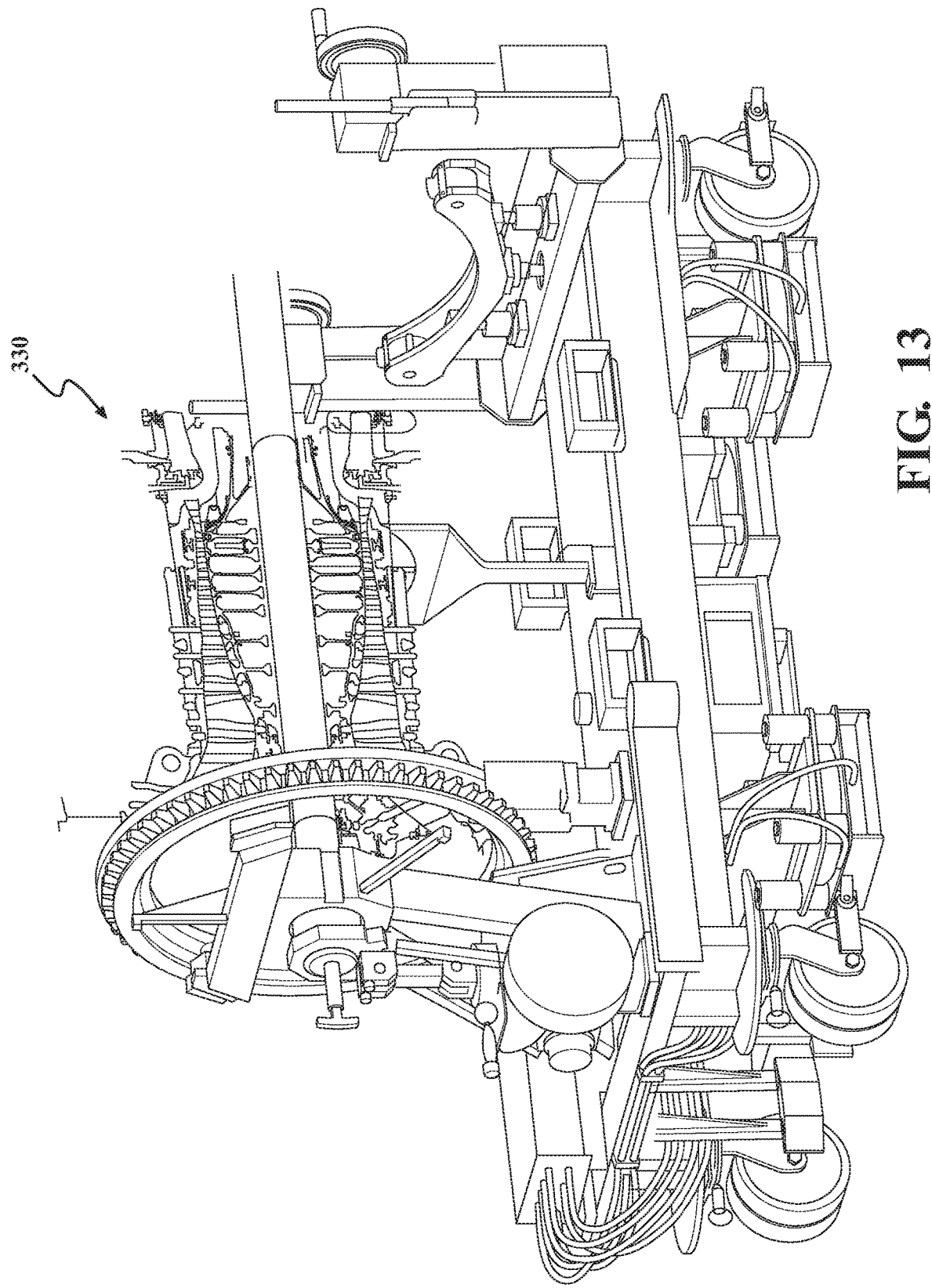
FIG. 13 is a perspective view of a horizontal engine build stand with a horizontal support tool installed within the first module and a second module.
Figure 14:
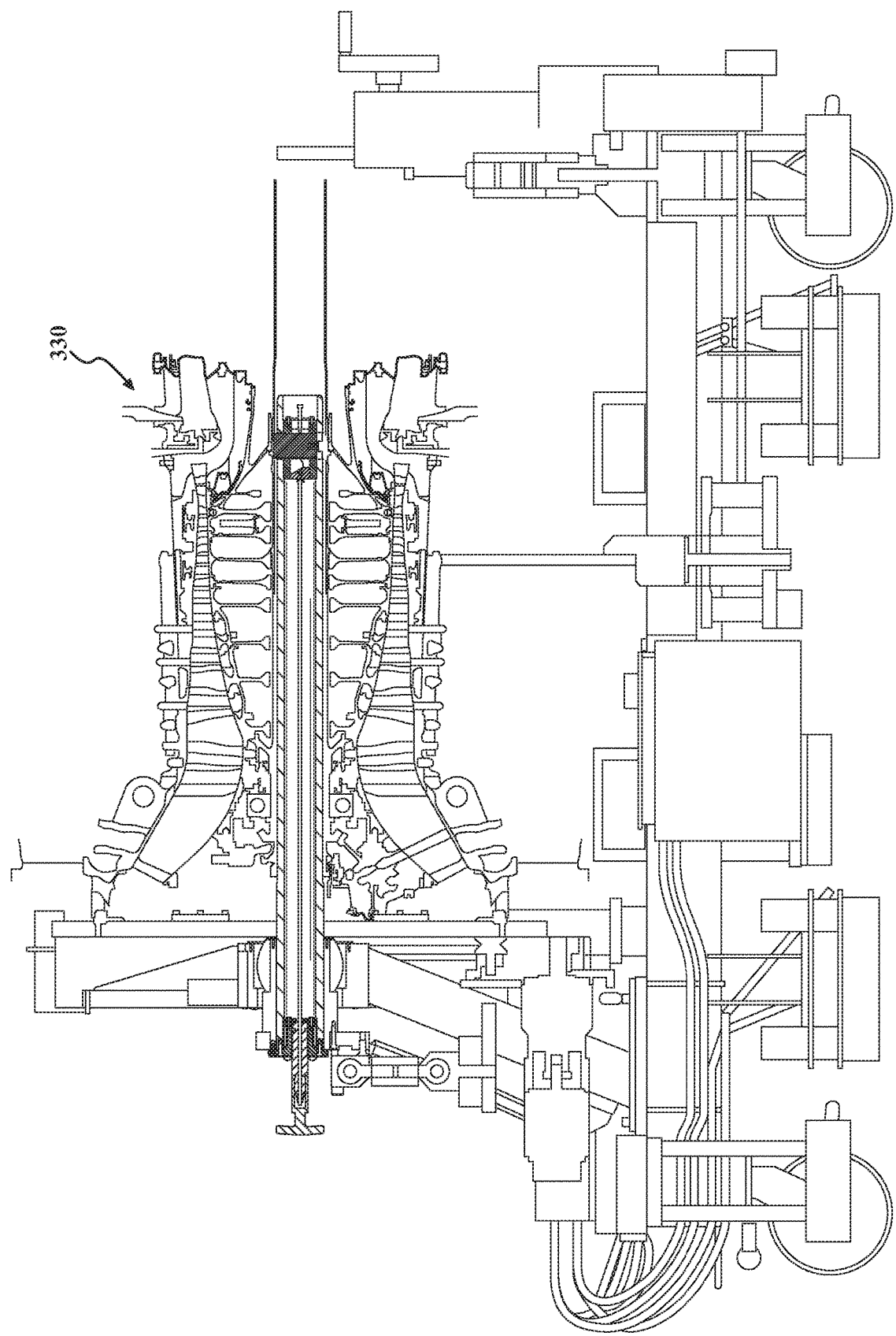
FIG. 14 is a side view of the horizontal engine build stand with the horizontal support tool installed within the first module and a second module.

Next, the support rod assembly 108 may be pre-adjusted in pitch for the expected weight of a second module 330 and the second module 330 is installed to the first module 300 (step 208; FIGS. 13 and 14). In this example, the second module 330 is a diffuser case which is relatively light in weigh and is mounted to the HPC case 308. Nevertheless, the support rod assembly 108 may be pre-adjusted, or adjusted concurrently with installation thereof.

Figure 15:
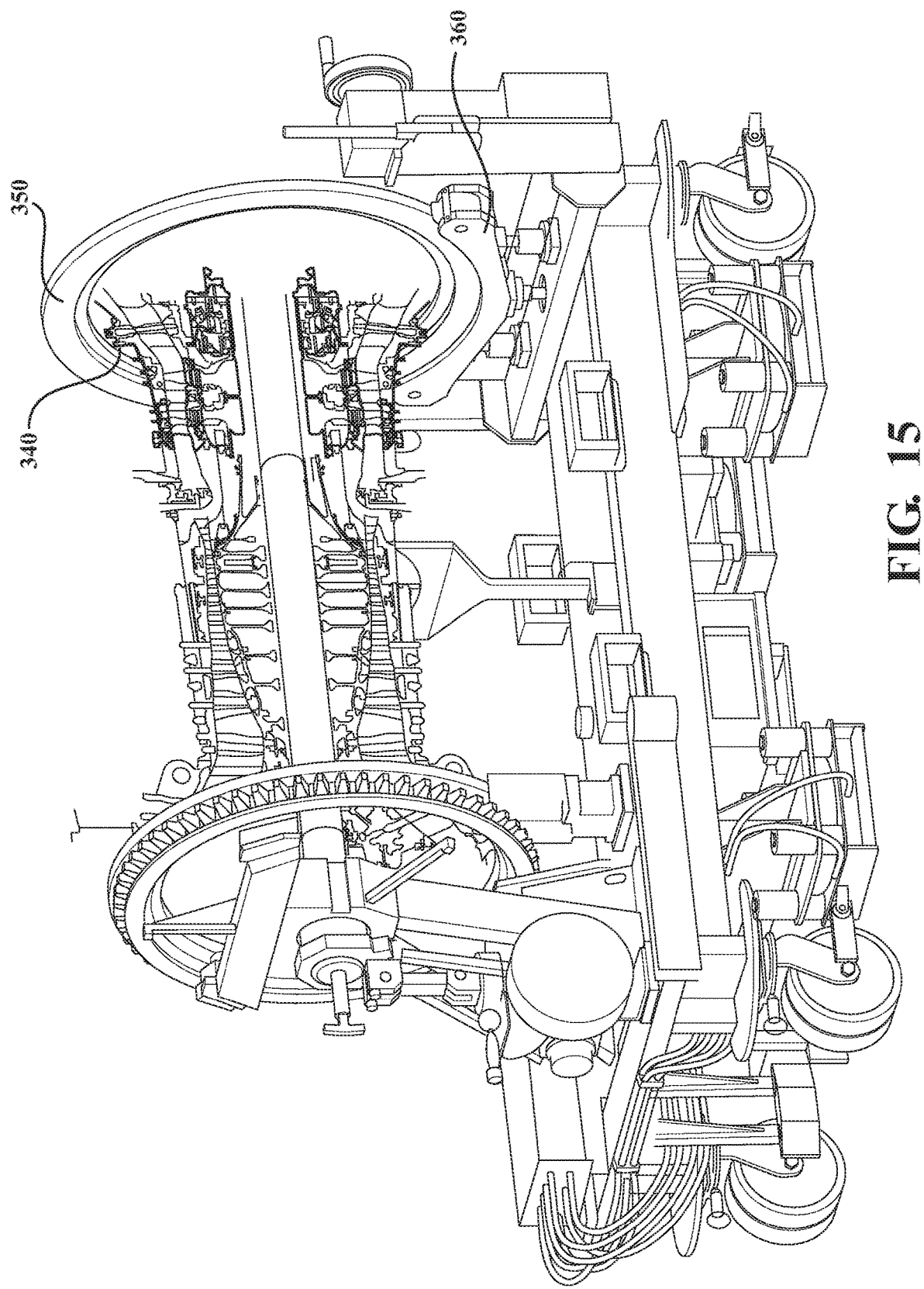
FIG. 15 is a perspective view of a horizontal engine build stand with a horizontal support tool installed within the first module, the second module and a third module.
Figure 16:
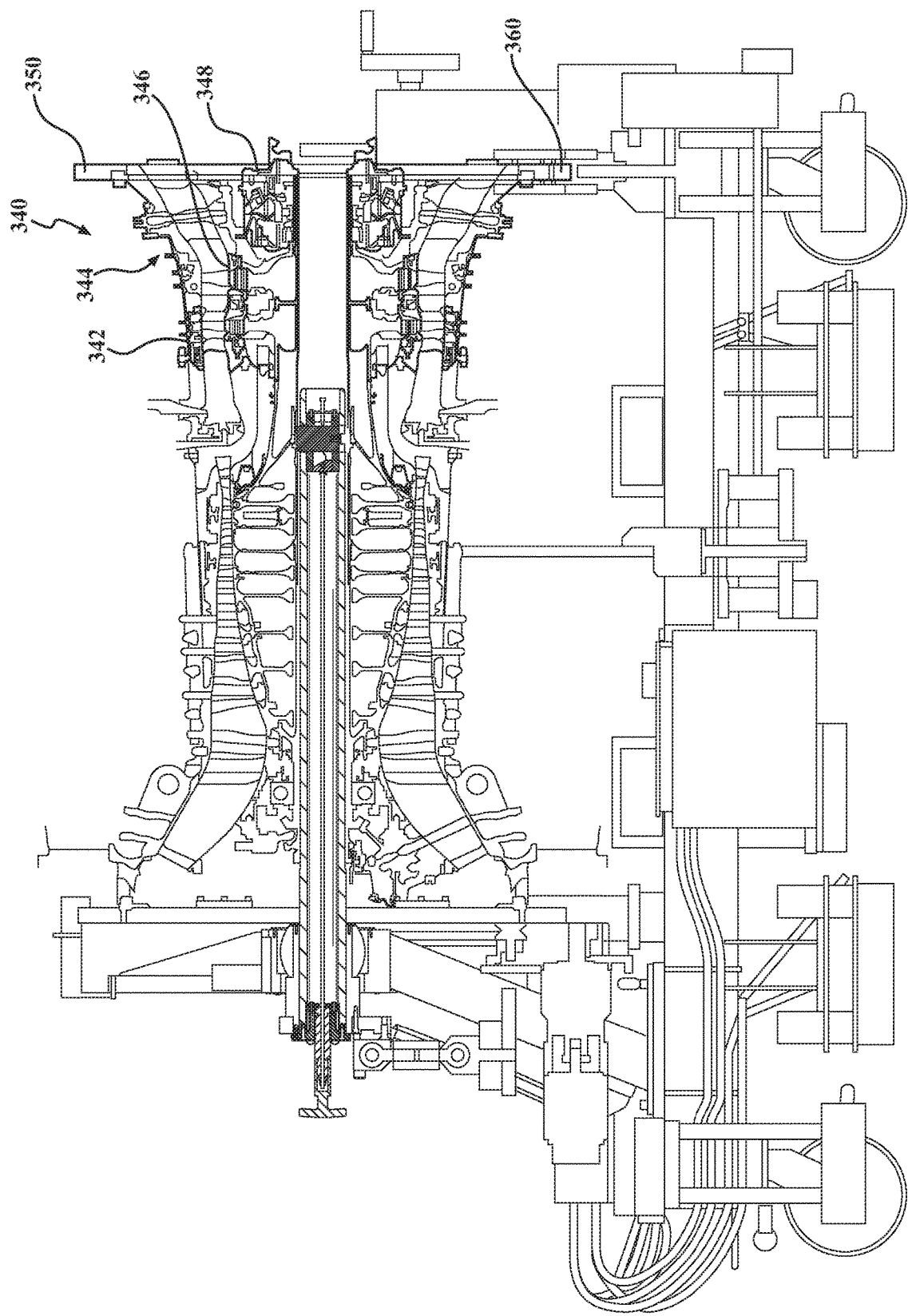
FIG. 16 is a side view of the horizontal engine build stand with the horizontal support tool installed within the first module, the second module and a third module.

Next, the support rod assembly 108 may be pre-adjusted in pitch for the expected weight of a third module 340 and the third module 340 is installed to the second module 330 (step 210; FIGS. 15 and 16). In this example, the third module 340 is a mid turbine frame 342, a high pressure turbine case 344 with the rotational turbine hardware 346 therein, and a #4 bearing structure 348. The third module 340 is installed to the engine build stand 100 such that the high pressure turbine case 344 is bolted to a support ring 350 such that the support ring 350 rests upon a case support 360 of the build cart 100.

Next, the case support 330 is removed (step 212). The support rings 320, 350 of the engine build stand 100 then support the engine assembly but the support rod assembly 108 remains therein.

Figure 17:
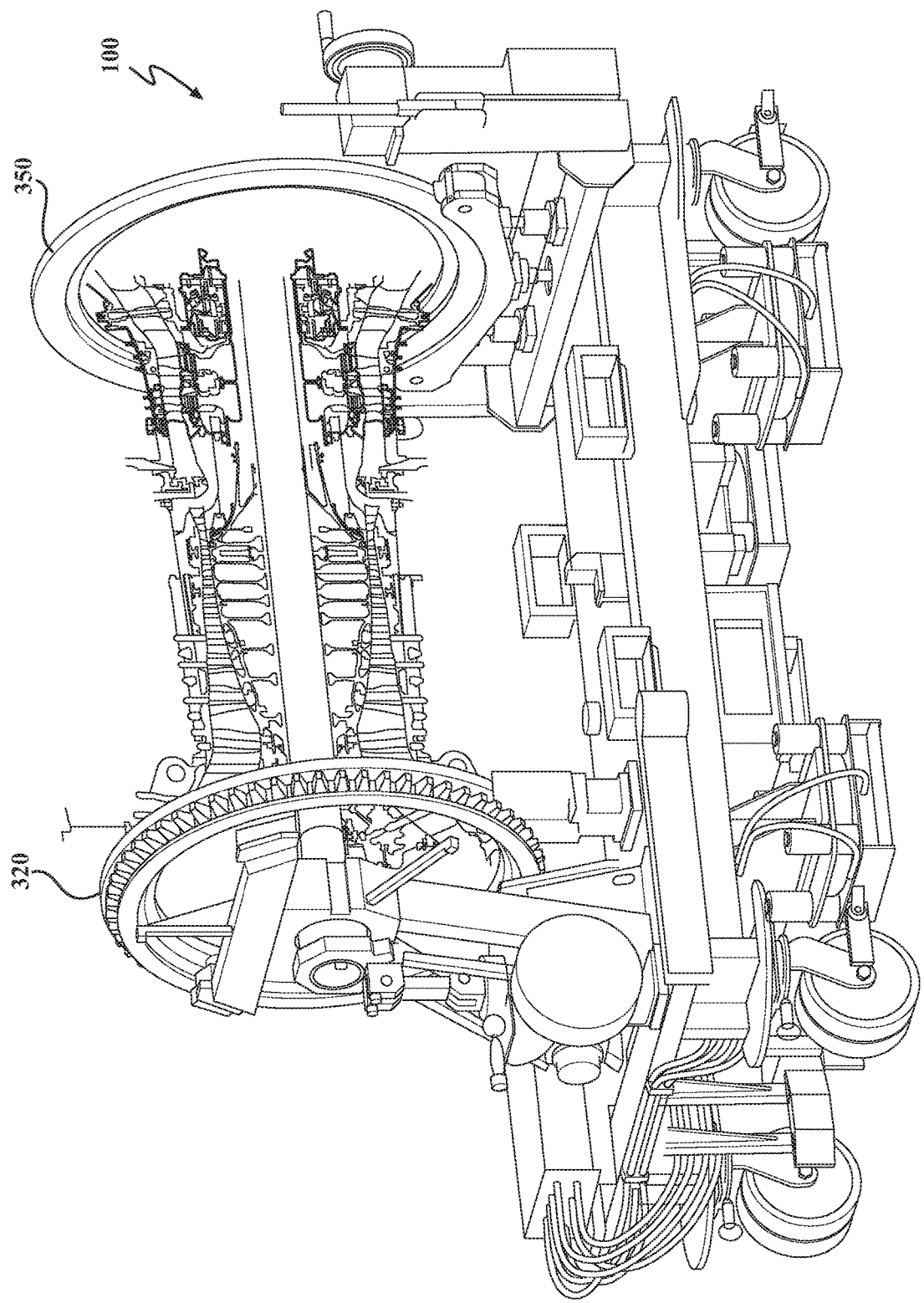
FIG. 17 is a perspective view of a horizontal engine build stand with the horizontal support tool removed from the first module, the second module and a third module.
Figure 18:
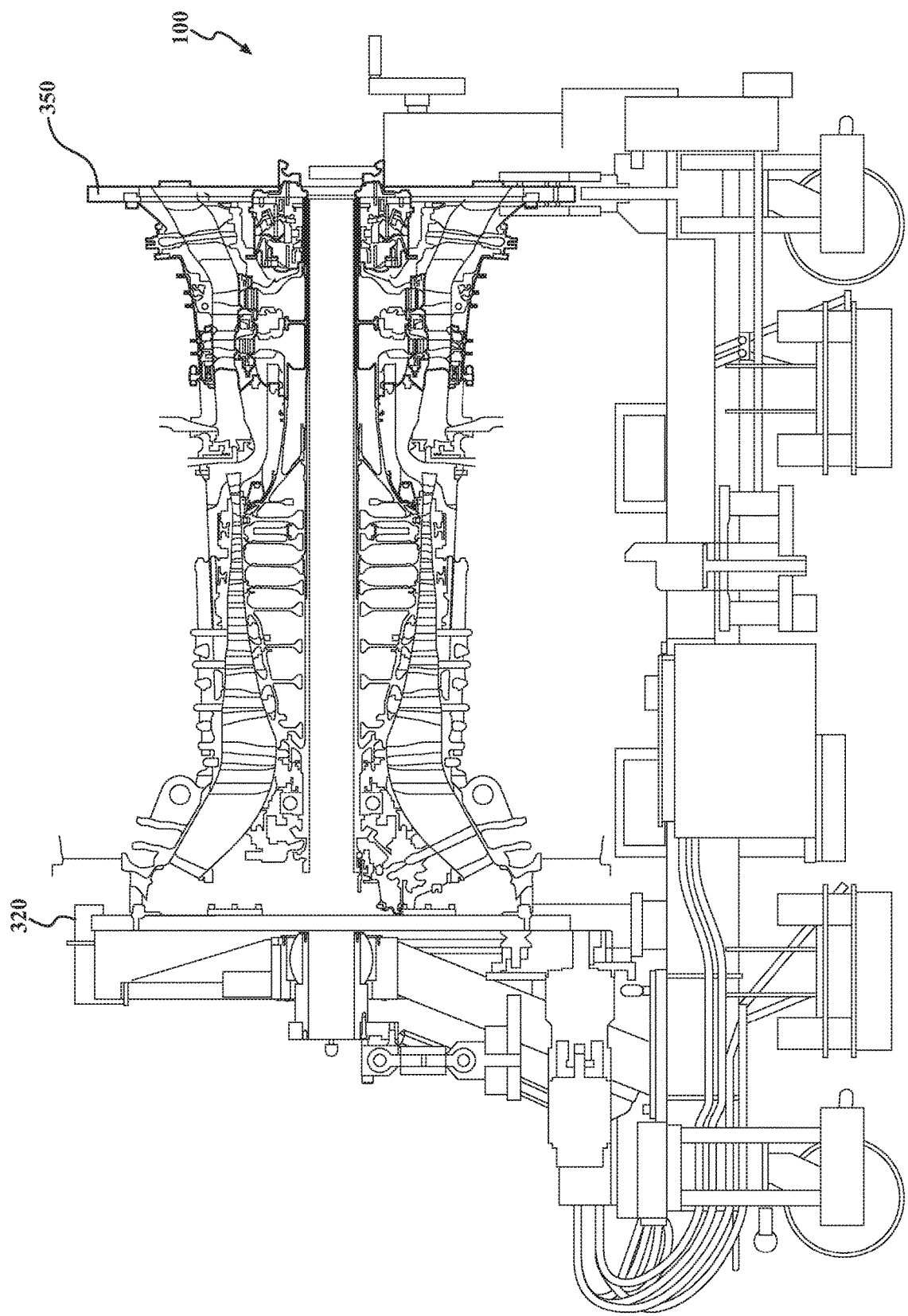
FIG. 18 is a side view of the horizontal engine build stand with the horizontal support tool removed from the first module, the second module and a third module.

Finally, the support rod assembly 108 is unloaded, the puck is retracted, and the support rod assembly 108 is removed from the engine assembly (step 214; FIGS. 17 and 18). The support rings 320, 350 on the engine build stand 100 then support the engine assembly such that the engine assembly may, for example, be rotated on the engine build stand 100 to permit further assembly such as mounting of externals, gearboxes, etc.

The support rod assembly 108 and engine build stand 100 facilitates the horizontal assembly of the core engine to maintain allowable deflection limits.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An engine build stand for a gas turbine engine, comprising:
   a support structure;
   a spherical bearing supported by the support structure;
   a horizontal support tool receivable within the spherical bearing, the horizontal support tool comprises a support tube along an axis, the support tube fits within rotational hardware of a gas turbine engine; and
   a tie shaft between a handle and a puck assembly, the puck assembly including a puck selectively extendable and retractable transverse to the axis through the support tube in response to rotation of the handle.

2. The engine build stand as recited in claim 1, wherein the horizontal support tool includes:
   a tie shaft between a handle and a puck assembly, the puck assembly including a puck selectively extendable and retractable transverse to the axis through the support tube in response to rotation of the handle.

3. The engine build stand as recited in claim 2, wherein the support tube is manufactured of a nonmetallic composite material.

4. The engine build stand as recited in claim 2, further comprising a turnbuckle to adjust a position of the horizontal support tool.

5. The engine build stand as recited in claim 4, further comprising a load cell to measure a weight applied to the horizontal support tool.

6. A method of horizontally assembling a portion of a gas turbine engine, comprising:
   mounting a first module to an engine build stand;
   installing a horizontal support tool into the first module, the horizontal support tool supported in a spherical bearing supported by the engine build stand such that a support tube extends into rotational hardware of the first module; and
   installing a second module to the first module, the horizontal support tool operable to at least partially support the second module.

7. The method as recited in claim 6, wherein the first module includes a bearing structure, a high pressure intermediate case (IMC) mounted to the bearing structure, and a high pressure compressor case with rotational compressor hardware therein, the high pressure compressor case mounted to the IMC.

8. The method as recited in claim 7, further comprising at least partially supporting the first module via a shipping fixture.

9. The method as recited in claim 8, further comprising preloading the horizontal support tool prior to removing the shipping fixture.

10. The method as recited in claim 6, further comprising supporting rotational hardware within the second module by the horizontal support tool.

11. The method as recited in claim 10, wherein the second module includes a high pressure turbine case.

12. The method as recited in claim 6, further comprising preloading the horizontal support tool prior to installation of the second module.

* * * * *